W. E. STAMM.
SIGNAL FOR HIGHWAYS.
APPLICATION FILED FEB. 21, 1921.
1,409,477.
Patented Mar. 14, 1922.
2 SHEETS—SHEET 1.
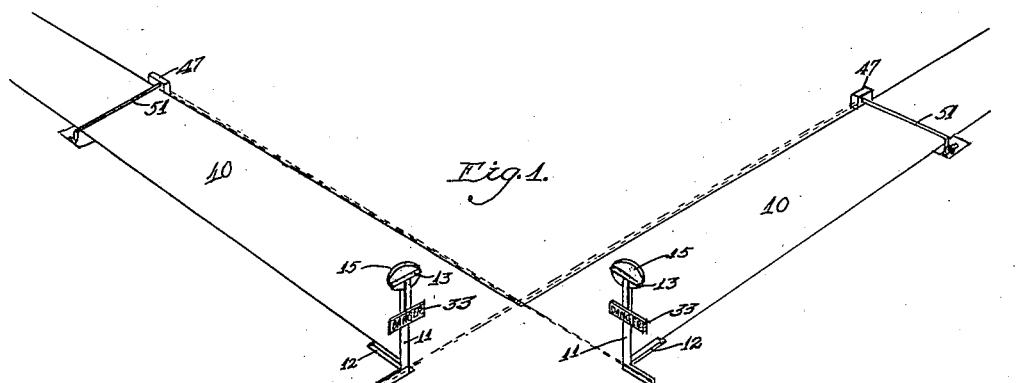
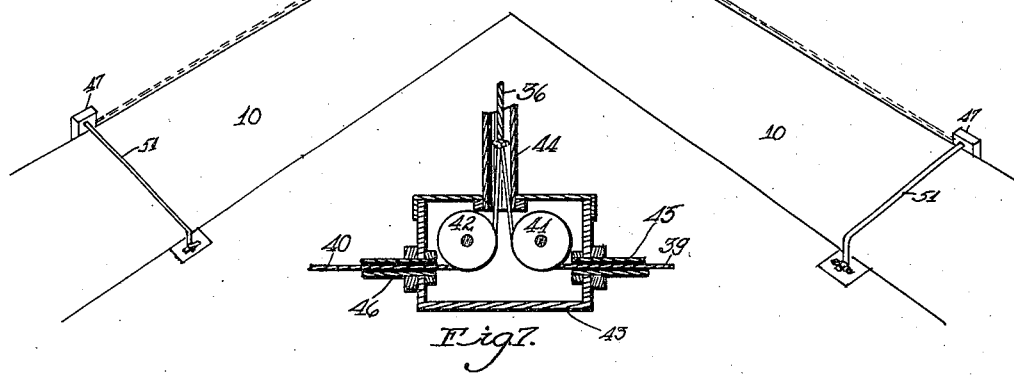
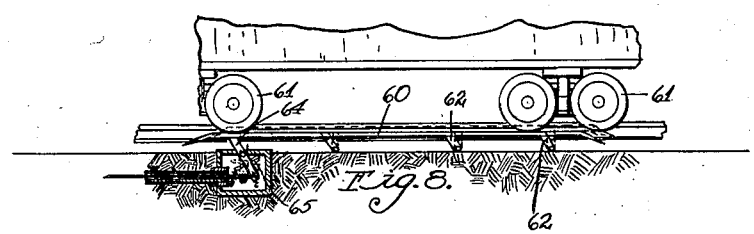
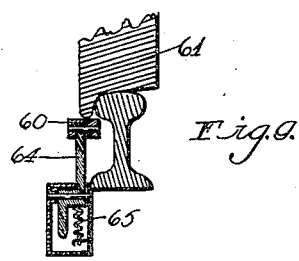
Inventor
William E. Stamm
by Orwig & Hague, Att'ys W. E. STAMM.
SIGNAL FOR HIGHWAYS.
APPLICATION FILED FEB. 21, 1921.
1,409,477.
Patented Mar. 14, 1922.
2 SHEETS—SHEET 2.
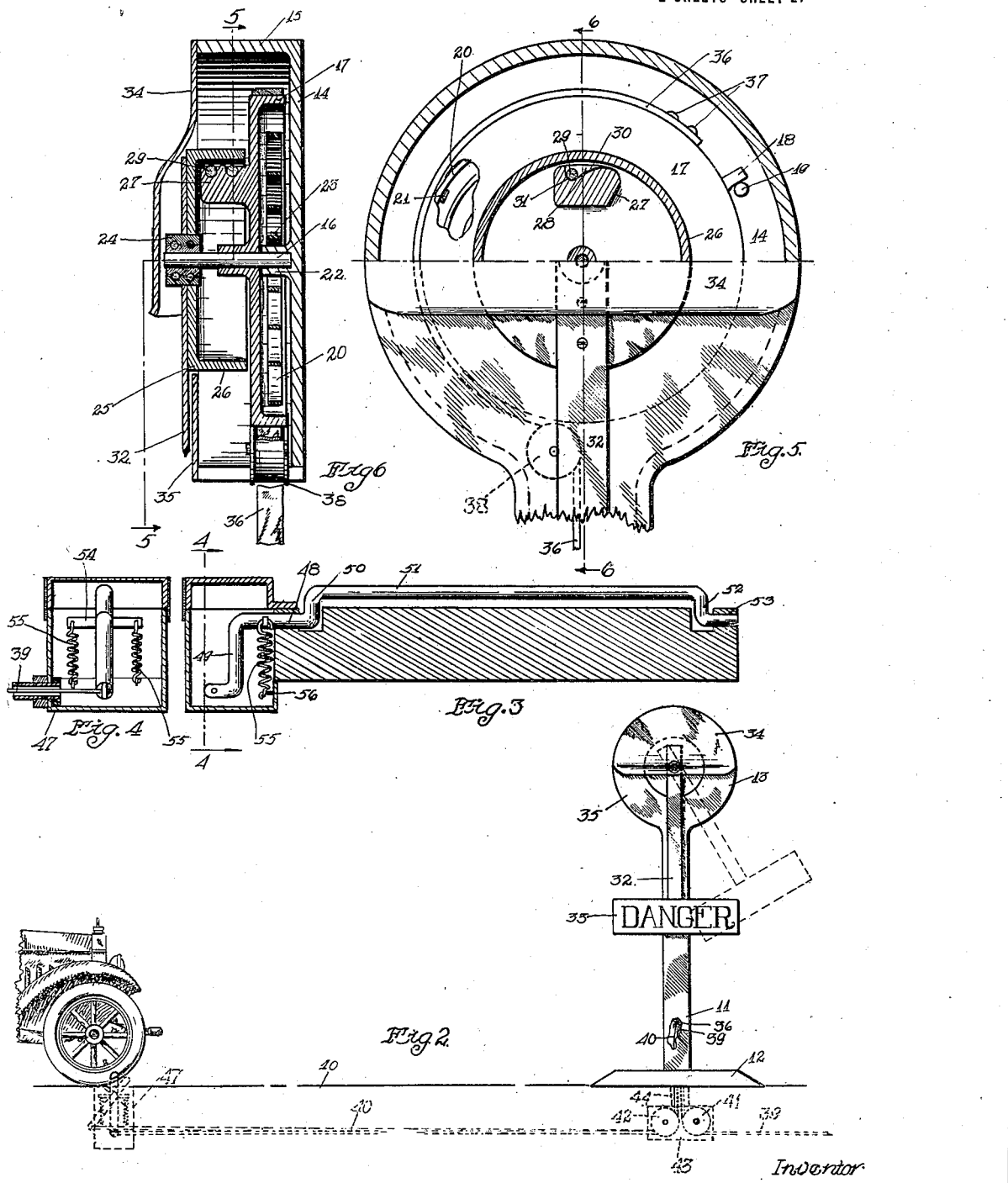

UNITED STATES PATENT OFFICE.

WILLIAM ELMER STAMM, OF SIBLEY, IOWA.

SIGNAL FOR HIGHWAYS.

1,409,477. Specification of Letters Patent. Patented Mar. 14, 1922.

Application filed February 21, 1921. Serial No. 446,858.

*To all whom it may concern:*

Be it known that I, WILLIAM ELMER STAMM, a citizen of the United States, and a resident of Sibley, in the county of Osceola and State of Iowa, have invented a certain new and useful Signal for Highways, of which the following is a specification.

This device relates to an improvement in devices for signaling drivers of automobiles and similar vehicles when two vehicles are approaching a road crossing from transverse directions.

It is the object of my invention to devise a signal device of simple, durable and inexpensive construction, especially adapted to be used at road crossings and to give to a driver of a vehicle on one road, warning when a vehicle is approaching near the said crossing on another intersecting road.

A further object is to provide a signal device for the purpose above stated, provided with means whereby a movable member may be actuated by the weight of an approaching vehicle, to set into motion a movable sign device to signal the driver of an approaching vehicle, and when said mechanism is set into motion, it will continue to operate for some time after the operating impulse has been imparted thereto.

These and other objects will be apparent to those skilled in the art, and need not be mentioned in detail.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view showing a road crossing and the general manner in which my improved signal device is mounted relative thereto.

Figure 2 is a side elevation of my improved signal device, showing its supporting member and automatically the manner in which a vehicle will operate the same.

Figure 3 is a sectional view taken transversely with the road bed at a point so as to show the operating or trip device in elevation.

Figure 4 is a detail sectional view, taken on the line 4—4 of Figure 3.

Figure 5 is an enlarged sectional detail view, taken on the line 5—5 of Figure 6.

Figure 6 is a vertical central, sectional view, taken on the line 6—6 of Figure 5.

Figure 7 is a detail sectional view of the mechanism beneath the signal supporting member, showing the manner in which the operating cables are mounted therein.

Figure 8 is a detail view of a modified form of my device showing the manner in which it may be applied to a railroad crossing.

Figure 9 is a detail transverse sectional view taken on the line 9—9 of Figure 8 showing the appliance of a car wheel operating the trip device.

My improved device comprises substantially a trip member 51, which is designed to be operated by means of a moving vehicle, and which is designed to be placed at a position of considerable distance ahead of the crossing, and to operate a signal device which is to be placed near or adjacent to the crossing, in such a manner that as a car approaches the crossing a warning may be given to any vehicle which may be approaching the crossing from the transverse direction.

My improved signal device comprises a supporting member 11, formed hollow and mounted upon a base 12 which may be secured in position at any convenient place near a road crossing. The upper end of the supporting member 11 is provided with a casing 13 having a back member 14 and an angular flange 15. The back member 14 is provided with a rigid pivot 16 within the casing, and is designed to receive a rotatively mounted drum 17. This drum 17 is provided with a stop pin 18 designed to coact with a pin 19 mounted in the member 14. The drum 17 is provided with a spring 20, one end of which is attached to said drum by means of a pin 21, and the opposite end is connected to the hub 22 of the member 14 by means of a pin 23. This spring 20 is so arranged that it will yieldingly hold the pin 18 adjacent to the pin 19 when the device is in a normal position.

Mounted on the pin 16, I have also provided a ball bearing 24, which is designed to carry a disc 25 having an inwardly extending flange 26, the inner edge of which is adjacent to the web portion of the drum 17. The web of the drum 17 is provided with a lug 27, which is designed to extend into the flange portion 26 and mounted adjacent to the inner surface thereof and provided with grooves 28, each of the grooves 28 being designed to carry a ball 29, the said grooves being provided with an inclined surface 30 and a socket 31, into which the ball 29 rests. The said grooves and balls are so arranged that when a rotary impulse is imparted to the drum 17, in a counter-clockwise direction, as shown in Figure 5. The balls 29 will follow the inclined portion 30 of said grooves, due to its inertia in such a manner that they will engage the inner face of the flange 26, thereby causing the said flange 26 and the member 27 to be rotated in unison. The purpose of this will be more fully set forth.

The disc 25 is provided with a depending arm 32, the lower end of which is provided with a horizontally arranged board 33, each side of which is printed a danger warning.

For protecting the ball bearing 24 against the action of the weather, I have provided a plate 34 on the forward portion of the casing, designed to overlap the said bearing as clearly illustrated in Figure 6. The lower portion of the casing is provided with a plate 35 for closing the lower portion of said casing. By this construction it will be seen that after an impulse is imparted to the drum 17 as before stated, against the action of the spring 20, the flange 26 and the disc 25 would be carried by means of the balls 29. This would in turn cause the board 33 to be swung in one direction, as the impulse is continued, until the drum 17 had rotated to an angle substantially equal to 45 degrees. And then, the reaction of the spring 20 would cause the drum 17 to return to its normal position with the pin 18 against the pin 19. The weight of the sign 33 would still have a tendency to cause said sign to continue in the direction in which it had started, thereby causing the balls 29 to disengage the flange 26 after the said flange had started in a reverse direction so the said balls would drop in the socket 31. The backward movement of said drum 17 would cause the balls to engage the back side of the slot 28, which is of such an angle that the balls could not grip the member 26, thereby permitting the drum 17 to freely return to its original position of movement. The board 33 would soon be reversed due to the action of gravity, after which it would continue to oscillate for a considerable time under the motion of the pendulum, and thereby give signal to an approaching vehicle.

In this connection it should be noted that the operating device hereinafter to be described will be so adjusted that when the pin 18 engages the pin 19 and the member 27 has come to rest, that this will happen before the signal arm 32 has started to return, so that the said arm 32 will not be returned at the time the said member 27 has come to rest. If the arm 32 should start to return before the member 27 came to rest, the arm 32 would be locked against downward movement, due to the fact that the inertia of the balls 29 would throw said balls into the wedge portions 30, and thereby lock the arm 32 against downward movement.

For producing the necessary impulse to the drum 17, I have devised a flexible member 36 which is secured in the drum by means of a pin 37 and passed over a pulley 38, which is clearly shown in Figures 5 and 6. This member 36 may be connected at its lower end to cables 39 and 40 which are designed to pass over pulleys 41 and 42 mounted in a box 43, which may be constructed of cast iron or other suitable material and if so desired, mounted in the ground beneath the foot of the support 11. The bottom end of the support 11 is provided with a downwardly extending flange 44, the lower end of which is connected with the cover of the box 43 so that a water tight passage may be provided. The end of the box 43 is also provided with pipes 45 and 46 which are designed to receive the cables 39 and 40, the said pipe 45 extending along the side of the road bed as illustrated in dotted lines in Figure 1. The outer ends of said pipes terminate in a cast iron box 47. One side of said box 47 is provided with a crank shaft 48 having a crank 49 on its inner end which is connected to the end of the cables 39 and 40. The outer end of the shaft 48 is provided with an upwardly extending crank 50, having a horizontally arranged rod 51 designed to extend across the road bed and, provided at its opposite end with a crank 52 which is mounted in a bearing 53. Each side of the shaft 48 is provided with a lateral arm 54, the outer end of each of said arms is provided with a downwardly extending spring 55, the lower end of which is connected to the side of the box 47 by means of a suitable pin 56.

By this arrangement, it will be seen that the cranks 50 and 52 are yieldingly held in a vertical position, so that the member 51 is above the surface of the road bed a slight distance, when the springs 55 have been so adjusted that the member 51 is in its upright position, then the cable 40 will be attached to the crank 49 in such a manner that the pin 18 will just touch the pin 19.

Figures 8 and 9 of the drawings show a modified form of my trip device which may be applied to the rails of a railroad track in such a manner that the signal device may be operated giving signal to the driver of a vehicle when the train is approaching the crossing of a highway. The only change necessary to convert my improved signal device is in the trip mechanism which is indicated by the numeral 60 and comprises a horizontally arranged bar placed adjacent to the inner edge of the ball of a rail in such a manner that it may be engaged by the flange of the car wheel 61. This bar 60 is of such length that it will be engaged by both the front and rear wheels of a car so that the said device may be substantially held down during the length of time while the train is passing over it. This is for the purpose of preventing the trip device from being unnecessarily actuated as one downward stroke of the bar is sufficient to set the signal into oscillation, which will continue to oscillate even if the trip bar is held stationary due to the fact that the member 27 will become stationary and the ball 29 will rest in its socket for the lack of any force to throw it into engagement with the drum 26. The said bar 60 is mounted on a series of pivotedly connected rings 62 which are secured to a stationary bar 63 for the purpose of supporting the central portion of the said bar 60. Each end of the bar 60 is curved downward so the wheels will not engage it too abruptly. One end of the bar 60 is also provided with a crank 64 which is similar to the crank 49 and works in the same manner as the said crank. The said crank is provided with springs 65 which are similar to the springs 55.

Thus it will be seen that my improved signal may be adapted to be either mounted at a position at the intersection of two highways or at the intersection of a highway and a railroad.

In the practical operation of my device, I have merely described the operation of the device as applied to the intersection of two highways, and it is believed that this description will be sufficiently clear so that any one versed in the art may apply the device to the intersection of a railroad and a highway.

The practical operation of my device is as follows:

When an automobile or any other vehicle approaches the member 51 as illustrated in Figure 2 or in the direction of the arrow in Figure 1, the front wheels of the vehicle will engage the rod 51 and cause it to be oscillated in the direction in which the vehicle is moving, or in this particular instance toward the signal. This will cause the cable 40 to be pulled as the crank 49 is moved inwardly. This in turn will cause the member 36 to be pulled downwardly, and the drum 17 to be oscillated or rotated as before described and the danger sign 33 set into oscillation.

In this connection it must be remembered that the impulse or movement imparted to the rod 51 is of short duration, being of just that time in which it requires the wheel of the vehicle to pass over it, after which it is again moved to its normal position by means of one of the springs 55. It will be seen that by mounting the support 11 so that the board 33 will move in a plan parallel with the road on which the moving vehicle is operating a danger signal will be given to the driver of a vehicle moving on a road transversely therewith. If a vehicle should approach in the opposite direction from the one illustrated in Figure 2, the cable 39 will be operated in a similar manner to the cable 40, and as the said cable is operated, the cable 40 would merely become slack so that no motion is imparted to the first said rod 51, or if the shaft 51 should be engaged by an automobile moving in the opposite direction, the said rods will be oscillating in a reversed direction to that shown in Figure 21, would merely cause a slack in the cable 40 and no movement would be imparted to the signal. The shaft 51 would be returned to its normal position by the spring 55.

By this arrangement, it will be seen that I have provided a signal of comparatively simple, durable and inexpensive construction which may be easily and quickly applied to the ordinary road beds with a signal on each of the intersecting roads, and thereby provide means whereby warning will be always given to the driver of a moving vehicle approaching a crossing at a transverse direction.

It will also be seen that I have provided a signal device which may be applied to the roads in any community, whether it be in the country or in town, as the device requires no electrical equipment or other source of power other than that which is derived from the moving vehicles.

The device is also so constructed and arranged that it may be successfully operated in almost any kind of weather.

I claim as my invention:

1. In a device of the class described, a support, a signal member pivoted to said support to oscillate as a pendulum, a pivoted rotary member adjacent to said oscillating member with means for imparting movement to said rotary member in one direction, and yielding means for returning said rotary member to its normal position, a clutch for imparting movement from said rotary member to said oscillating member, said clutch being adapted to become inoperative when said rotary member is at rest.

2. In a device of the class described, a trip device designed to be operated by a moving vehicle on a highway, a support located near the intersection of a number of highways, a signal device mounted thereon designed to oscillate in a plane substantially parallel with the plane in which the moving vehicle is traveling, a rotary member adjacent to said oscillating signal, means operatively connected to said trip and said rotary member to move said rotary member in one direction, yielding means for returning said rotary member to its normal position of movement, a clutch for imparting movement from said rotary member to said oscillating member, said clutch being adapted to become inoperative when said rotary member is at rest.

3. In a device of the class described, a support, a casing thereon, a pivoted rotary member in said casing, an oscillating member adjacent thereto, a signal board depending from said oscillating member, means for imparting movement to said rotary member in one direction, yielding means for returning said rotary member to its normal position, a clutch for imparting movement from said rotary member to said oscillating member, said clutch being adapted to become inoperative when said rotary member is at rest.

4. In a device of the class described, a support, a casing, a drum rotatively mounted therein, means for limiting the movement of said drum in one direction, a flexible operating member for said drum, yielding means for returning the drum to its normal position of movement, an oscillating signal member, a centrifugally actuated clutch carried by said drum for imparting movement to said oscillating member in one direction, a trip device designed to be actuated by the movement of a vehicle, and means actuated by said trip device for imparting movement to said drum.

WILLIAM ELMER STAMM.